Feb. 25, 1958 — V. J. ROPER — 2,824,489
VEHICLE HEADLAMP HAVING MEANS
FACILITATING INSTALLATION
Filed May 6, 1955
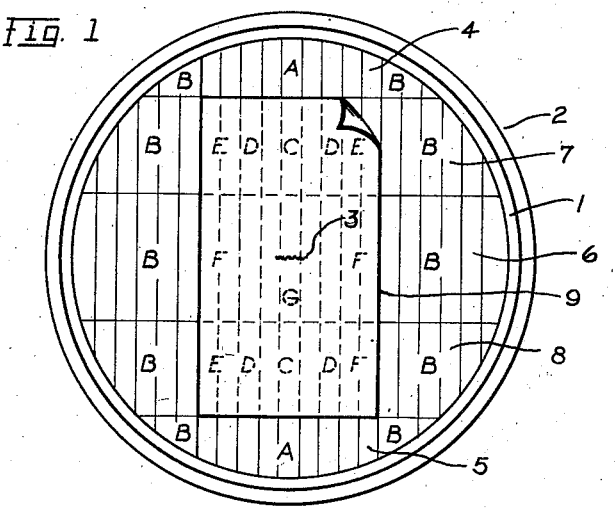
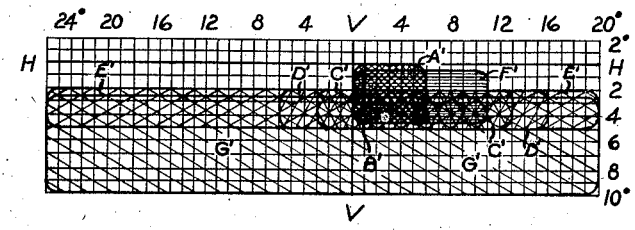
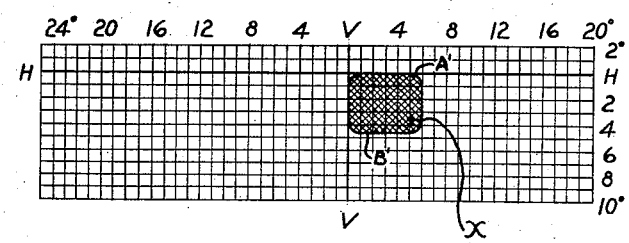
Inventor:
Val J. Roper
by Vernet C. Kauffman
His Attorney United States Patent Office 2,824,489
Patented Feb. 25, 1958

2,824,489

VEHICLE HEADLAMP HAVING MEANS FACILITATING INSTALLATION

Val J. Roper, Cleveland, Ohio, assignor to General Electric Company, a corporation of New York Application May 6, 1955, Serial No. 506,423

9 Claims. (Cl. 88—14)

This invention relates in general to vehicle headlamps and more particularly to a vehicle headlamp having means for facilitating the installation thereof in properly aimed position on the vehicle.

When a vehicle headlamp is installed on a vehicle such as an automobile, the headlamp must be properly positioned on the vehicle so as to aim the projected light beam or beams in the desired manner down the roadway. For this purpose, it is customary to provide the vehicle with lamp-supporting holders which are adjustable to enable the proper aiming of the headlamps. The headlamps are usually aimed, through adjustment of the lamp-supporting holders by locating the high-intensity zone of the projected light beam with relation to horizontal and vertical lines on a vertical screen or surface located in front of the headlamp. In some cases the center of the high-intensity zone of the projected light beam is directed at the intersection of a vertical and horizontal line on the screen. In other cases, it is desirable to aim the edges of the high-intensity zone of the projected light beam. However, irrespective of the particular method employed for aiming the headlamp, because of the difficulty of discerning with exactness the edges of the high-intensity zone in the full beam projected by a vehicle headlamp, the aiming of the headlamp on the vehicle has heretofore been a matter of guess work for the most part.

One object of my invention, therefore, is to provide a vehicle headlamp constructed to facilitate the proper and exact aiming thereof on the vehicle on which it is installed.

Another object of my invention is to provide a vehicle headlamp having means for enabling the ready and exact discernment of the edges of the high-intensity zone of the projected light beam from the headlamp.

Still another object of my invention is to provide a vehicle headlamp which is initially only partially operable so as to project only the high intensity component of the composite light beam which the headlamp is designed to project, to thereby facilitate the proper aiming of the headlamp on the vehicle on which it is installed, and which thereafter can be rendered fully operative so as to project the complete light beam.

Briefly stated, in accordance with one aspect of the invention, the lens of a vehicle headlamp is provided with a readily detachable or removable layer of masking material covering only that portion of the surface area of the lens other than that which provides the high-intensity portion of the light beam projected by the headlamp. In accordance with a further aspect of the invention, the layer of masking material may have imprinted or otherwise suitably applied thereto an inscription or other marking, such as instructions for installing and aiming the headlamp on a vehicle.

Further objects and advantages of the invention will appear from the following detailed description of a species thereof and from the accompanying drawing.

In the drawing,

Fig. 1 is a front elevation of a vehicle headlamp comprising my invention.

Fig. 2 is a chart showing the pattern of the complete light beam produced by the headlamp, and Fig. 3 is a chart showing the pattern of the high-intensity portion of the light beam produced by the headlamp.

Referring to the drawing, the invention is there shown as applied to a vehicle headlamp of the all-glass sealed beam type such as described and claimed in United States Patent 2,148,314, D. K. Wright, issued February 21, 1939, and comprising a pressed glass lens section 1 and a pressed glass reflector section (not shown) of paraboloidal or other suitable optical shape, fusion-sealed together at their peripheries to form a hermetically sealed glass enclosure or bulb 2. Disposed within the bulb or envelope 2 so as to be located at or in the immediate vicinity of the optical focus of the reflector section is a light source 3 which may be in the form of a linear coil of tungsten wire. The filament 3 is connected in the conventional manner to external terminal contacts on the lamp for supplying electric current thereto, as disclosed in the aforesaid Wright patent.

Vehicle headlamps such as are used on automobiles are customarily designed to project a light beam having a pattern characterized by a more or less centrally located high-intensity upper portion extending far down the roadway and formed with sharply defined edges, and a widespread lower portion of gradually decreasing intensity from the center of the beam outwardly to the side edges thereof. To this end, the lens 1 is provided with suitable light-refracting media designed to refract and redirect the light rays passing through the lens into a beam of the desired pattern and having the aforementioned high-intensity portion. The light-refracting media on the lens may consist of prisms and flutes of various refractive power and different degrees of light spread formed on one or the other, or both, of the surfaces of the lens, preferably on the inner surface thereof. In the particular case illustrated, the lens 1 is designed to produce an asymmetric passing beam having a pattern of the general character shown in Fig. 2 wherein the high-intensity portion A' and B' of the beam is offset to the right of the vertical plane V—V passing through the reflector focal point parallel to the longitudinal axis of the vehicle on which the headlamp is mounted.

Referring to Fig. 1, the particular lens 1 illustrated comprises a plurality of substantially horizontal sections, consisting of a top section 4, a bottom section 5, a center section 6, and upper and lower intermediate sections 7, 8. The top and bottom sections 4, 5 each comprises a central area A and side areas B. The intermediate sections 7, 8 each comprises a central area C, primary intermediate areas D, secondary intermediate areas E, and side areas B. The center section 6 comprises a central area G, intermediate areas F, and side areas B.

The high-intensity portion of the light beam projected by a vehicle headlamp such as used on automobiles, and particularly the high-intensity portion of an asymmetric passing beam, ordinarily is of relatively narrow spread both in a vertical and horizontal direction. To obtain a high-intensity beam portion of narrow vertical spread, the light rays making up the same must, of necessity, be taken from those portions of the reflector projecting the smallest images of the filament or light source 3, which images are more easily controlled than the larger ones. The smallest images of the light source 3 will be projected by those portions of the reflector furthest from the light source. These small images are projected through those portions of the lens immediately adjacent the periphery thereof. It is for this reason, therefore, that the rays of light passing through the areas A and B (Fig. 1) of the particular lens 1 illustrated, comprising the top and bottom sections 4 and 5 respectively, and the extreme outer or side portions of the center and intermediate sections 6, 7 and 8, are utilized to make up the high-intensity portion of the composite passing beam shown in Fig. 2. The remaining centrally located areas of the lens, comprising the vertically-elongated rectangular zone defined by the areas C, D, E, F and G, are utilized to make up the widespread lower portion of the composite passing beam, as denoted by the portions C', D', E', F' and G' in the beam pattern shown in Fig. 2, which beam portions correspond to and are provided, respectively, by the areas C, D, E, F and G of the lens. The particular lens 1 illustrated is of the type described and claimed in United States Patent 2,177,216, Howard et al., issued October 24, 1939, and assigned to the assignee of the present invention.

The following table lists the various areas into which the particular lens 1 illustrated is preferably divided, together with the corresponding degree of horizontal and vertical prism and horizontal light spread.

| Area | Horizontal prism | Horizontal Spread, degrees | Vertical Prism |
|---|---|---|---|
| A | 4½° up | 1 | 4° left. |
| B | 3° up | 3 | 4° left. |
| C | None | 10 | None. |
| D | None | 15 | None. |
| E | None | 40 | 15° left. |
| F | 2° up | 2 | None. |
| G | Graded down 1° to 8° | 40 | 15° left. |

To facilitate the installation of the headlamp 2 in properly aimed position on the automobile or other vehicle on which it is to be mounted, the lens 1 of the headlamp is provided, in accordance with the invention, with a layer 9 of suitable opaque masking material covering those portions or areas C, D, E, F and G of the surface of the lens other than the portions or areas A and B thereof which provide the high-intensity portion A'B' of the composite or complete light beam normally projected by the headlamp. By thus masking the lens 1 so as to expose only those areas A and B thereof providing the high-intensity zone of the projected light beam, it is then easier to see or discern the edges of the high-intensity zone and it is, therefore, easier to correctly aim the headlamp on the aiming screen.

The result produced by masking the lens 1 in the manner according to the invention is clearly shown in Fig. 3, the cross-hatched area A', B' representing the high-intensity beam component provided by the areas A and B of the lens. In the case of a headlamp for the production of an asymmetric passing beam, the headlamp is properly positioned or aimed on the vehicle by adjusting the lamp-supporting holder so as to locate the upper edge and the left side edge of the high-intensity beam component A'B' approximately coincident with the horizontal plane H—H and the vertical plane V—V, respectively, passing through the reflector focal point parallel to the longitudinal axis of the vehicle, as shown in Fig. 3. In the case of a vehicle headlamp having a lens 1 of the particular prescription as set forth hereinabove, the aiming point X (Fig. 3) of the headlamp reflector is preferably located approximately 3½° below the horizontal plane H—H and 5° to the right of the vertical plane V—V, as shown.

The layer of masking material 9 on the lens 1 may be made of any suitable light-impervious or opaque material which will normally remain adherent to the surface of the glass lens 1 but which can be readily removed or detached therefrom as by peeling it off for instance, after completion of the lamp aiming operation. Materials which are particularly suitable for the purposes of the invention are synthetic plastic resins, such as that commercially known as "Flexkote" for example, which form a rubber-like film on the glass lens that can be peeled off with ease. Other suitable materials include water-soluble paints which can be sprayed or painted on the lens and can be washed off or otherwise removed therefrom. The layer 9 of masking material is preferably applied, and in the case of an all-glass sealed beam lamp such as described hereinabove would, of necessity, have to be applied to the outer surface of the lens 1.

If desired, the layer 9 of masking compound or material on the lens 1 may have an inscription or other marking, such as lamp installation instructions, advertising material, etc. imprinted or otherwise applied thereon. The provision on the masking layer 9 of such instructions for proper installation and aiming of the headlamp on the vehicle provides a particularly convenient way of assisting the installer to obtain proper aiming of the headlamp on the vehicle at the time of the initial installation thereon.

Although a preferred embodiment of my invention has been disclosed, it will be understood that the invention is not to be limited to the specific construction and arrangement of parts shown, but that they may be widely modified within the spirit and scope of my invention as defined by the appended claims. Thus, while I have described the invention as applied to a vehicle headlamp of the self-contained all-glass sealed beam type such as disclosed in the aforesaid United States Patent 2,148,314, Wright, it will be obvious that the invention is applicable as well to other types of vehicle headlamps such as those in which the lens and reflector are formed as separate members which are suitably clamped together as by means of a clamping ring for instance. Also, the particular form of lens 1 shown and described is merely illustrative, it being understood that the lens may be of any prescription (i. e., any arrangement of light-modifying prisms and flutes) which will produce a beam pattern having a high-intensity portion formed by the light rays passing through certain selected areas of the lens, the layer 9 of masking material covering substantially all of the surface area of the lens other than such selected high-intensity beam component areas thereof.

What I claim as new and desire to secure by Letters Patent of the United States is:

1. A vehicle headlamp comprising a reflector, a light source mounted within the reflector, a lens covering the mouth opening of said reflector and provided with light-refracting media for refracting the light rays passing through the lens into a light beam having a high-intensity portion, and a layer of masking material on said lens covering only that portion of the surface area thereof other than that which provides the said high-intensity portion of the light beam, said layer of masking material being adherent to the surface of said lens but readily separable therefrom.

2. A vehicle headlamp as specified in claim 1 wherein the said layer of masking material is disposed on the outer surface of said lens.

3. A vehicle headlamp as specified in claim 1 wherein the said layer of masking material is provided with an inscription thereon.

4. A vehicle headlamp as specified in claim 1 wherein the said layer of masking material is composed of a synthetic plastic resin readily peelable off the said lens.

5. A vehicle headlamp comprising a reflector, a light source mounted within the reflector, a lens covering the mouth opening of said reflector and provided with light-refracting media for refracting the light rays passing through the lens into a light beam having a high-intensity portion, and a layer of synthetic plastic resin masking material on the outer surface of said lens and covering only that portion of the surface area thereof other than that which provides the said high-intensity portion of the light beam, said layer of masking material being adherent to the surface of said lens but readily separable therefrom and having lamp installation instructions imprinted thereon.

6. A vehicle headlamp comprising a sealed glass bulb including a reflector section and a lens section, a concentrated filament mounted within said bulb in definite optical relation to the said reflector section thereof, said lens being provided with light-reflecting media for refracting the light rays passing through the lens into a light beam having a high-intensity portion, and a layer of opaque masking material on the outer surface of said lens and covering only that portion of the surface area thereof other than that which provides the said high-intensity portion of the light beam, said layer of masking material being adherent to the surface of said lens but readily separable therefrom.

7. A vehicle headlamp as specified in claim 6 wherein the said layer of masking material is composed of a synthetic plastic resin.

8. A vehicle headlamp as specified in claim 6 wherein the said layer of masking material is provided with an inscription thereon.

9. A vehicle headlamp comprising a sealed glass bulb including a reflector section and a lens section, a concentrated filament mounted within said bulb in definite optical relation to the said reflector section thereof, said lens being provided with light refracting media for refracting the light rays passing through the lens into a light beam having a high-intensity portion, and a layer of synthetic plastic resin masking material on the outer surface of said lens and covering only that portion of the surface area thereof other than that which provides the said high-intensity portion of the light beam, said layer of masking material being adherent to the surface of said lens but readily separable therefrom and having lamp installation instructions imprinted thereon.

References Cited in the file of this patent

UNITED STATES PATENTS

| | | |
|---|---|---|
| 1,471,790 | Grondahl | Oct. 23, 1923 |
| 1,820,788 | Failing | Aug. 25, 1931 |
| 2,003,797 | Arbuckle | June 4, 1935 |